(12) United States Patent
Shem-Tov et al.

(10) Patent No.: US 12,531,813 B2
(45) Date of Patent: *Jan. 20, 2026

(54) COMMUNICATION NETWORK CONFIGURATION

(71) Applicant: ECI Telecom Ltd., Petah Tikva (IL)

(72) Inventors: Ziv Shem-Tov, Ramat Hasharon (IL); Shirel Ezra, Petah Tikva (IL); Efraim Gelman, Petah Tikva (IL)

(73) Assignee: ECI Telecom Ltd., Petah Tivka (IL)

( * ) Notice: Subject to any disclaimer, the term of this patent is extended or adjusted under 35 U.S.C. 154(b) by 262 days.

This patent is subject to a terminal disclaimer.

(21) Appl. No.: 18/349,664

(22) Filed: Jul. 10, 2023

(65) Prior Publication Data

US 2024/0305578 A1    Sep. 12, 2024

Related U.S. Application Data

(60) Provisional application No. 63/489,524, filed on Mar. 10, 2023.

(51) Int. Cl.
*H04L 47/36* (2022.01)
*H04L 41/0823* (2022.01)
*H04L 41/0896* (2022.01)

(52) U.S. Cl.
CPC ......... *H04L 47/36* (2013.01); *H04L 41/0823* (2013.01); *H04L 41/0896* (2013.01)

(58) Field of Classification Search
None
See application file for complete search history.

(56) References Cited

U.S. PATENT DOCUMENTS

| | | | |
|---|---|---|---|
| 9,172,580 B1* | 10/2015 | Paczkowski | H04W 12/0433 |
| 10,903,904 B1* | 1/2021 | Ezra | H04B 10/25 |
| 11,356,179 B2 | 6/2022 | Ezra et al. | |
| 11,595,294 B1 | 2/2023 | Shem-Tov | |
| 2012/0301140 A1 | 11/2012 | Zhang et al. | |
| 2015/0052233 A1 | 2/2015 | Takita et al. | |
| 2017/0270697 A1* | 9/2017 | Keys | G06F 40/143 |
| 2021/0384969 A1* | 12/2021 | Kovsh | H04B 10/0779 |
| 2022/0014273 A1 | 1/2022 | Ezra et al. | |

OTHER PUBLICATIONS

European Communication Regarding Extended European Search Report in counterpart European Patent Application No. 24162799.1 mailed Aug. 2, 2024, 10 pages.
Psychas, K. et al., "High-Throughput Bin Packing: Scheduling Jobs with Random Resource Demands in Clusters", IEEE/ACM Transactions on Networking, vol. 29, No. 1, (Feb. 2021), 14 pages.

\* cited by examiner

*Primary Examiner* — Andre Tacdiran
(74) *Attorney, Agent, or Firm* — Finnegan, Henderson, Farabow, Garrett & Dunner LLP

(57) ABSTRACT

A set of demands on a communication network between a source node and a terminal node can be packed into a set of packages. Each package can be associated with a corresponding transceiver type. The packing of the set of demands into the set of packages can be performed using a heuristic method or a dynamic programming method. The packing of the set of demands can depend on the costs associated with each package. Multiple packings can be generated using different packing conditions. One of the multiple packings can then be selected. The communication network can be configured to satisfy each package using a transceiver of the corresponding transceiver type.

20 Claims, 7 Drawing Sheets

First Sub-Packing 615

Second Sub-Packing 625

COMMUNICATION NETWORK CONFIGURATION

CROSS-REFERENCE TO RELATED APPLICATIONS

This application claims the benefit of U.S. Provisional Application No. 63/489,524, filed Mar. 10, 2023. This application is incorporated herein by reference in its entirety.

TECHNICAL FIELD

The present disclosure relates to the field of communication networks and, more particularly, to systems and methods for packing sets of demands on communication networks into sets of packages of demands.

BACKGROUND

An optical communication network can be configured to satisfy demands. Such demands can include requests to communicate (or establish a communication channel, or the like) between a source node and a target node in the network. The communication network can satisfy the demands using one or more routes provided through the communication network. Each route can be implemented using hardware (e.g., transceivers, or the like) or software resources (e.g., compute, memory, or the like) of the communication network.

In some instances, multiple demands can share the same source node and target node. Assigning separate resources to each of these multiple demands can be an inefficient use of network resources.

SUMMARY

Systems and methods are disclosed for packing a set of demands on a communication network into a set of packages. Each package can be associated with a corresponding transceiver type. The packing of the set of demands into the set of packages can be performed using a heuristic method or a dynamic programming method. The communication network can be configured to satisfy each package using a transceiver of a corresponding transceiver type.

The disclosed embodiments include a network management method. The network management method can include obtaining network information for a communication network. The network information can include a set of demands having a common source node and a common terminal node on the communication network and a set of transceiver types. The network management method can include packing the set of demands into packages. The packing can include determining candidate packages. Each candidate package can be associated with a transceiver type, include a subset of the set of demands, and have a package cost. A total volume of the subset of the set of demands can be less than or equal to a capacity of the transceiver type. The packing can include selecting among the candidate packages based on the package costs. The packing can include updating the set of demands to remove the subset of the set of demands of the selected candidate package. The network management method can include providing instructions to configure the communication network to satisfy the demands in each package using a transceiver of the transceiver type associated with the selected candidate package.

The disclosed embodiments also include another network management method. The network management method can include packing a set of demands on a communication network into packages. The demands can have a source node and a terminal node. Each of the packages can be associated with a corresponding transceiver type of a set of transceiver types. The packing can include determining a first sub-package of the set of demands into a first package and a remainder package. The determination can include selecting a first transceiver type of the set of transceiver types. The determination can further include determining the first package using the first transceiver type. The first package can include a first subset of the set of demands. The determination can further include determining the remainder package of the set of demands, excluding the first subset, using the set of transceiver types. The packing of the set of demands can include determining a first sub-package cost based on the first package and the remainder package. The packing of the set of demands can include determining a second sub-package of the set of demands using the set of transceiver types, excluding the first transceiver type. The packing of the set of demands can include determining a second sub-package cost based on the second sub-package. The packing of the set of demands can include selecting among the first sub-package and the second sub-package based on the first sub-package cost and the second sub-package cost. The network management method can include providing instructions to configure the communication network to satisfy the demands in each of the packages using a transceiver of the corresponding transceiver type.

The disclosed embodiments further include systems configured to perform the disclosed methods, and non-transitory, computer-readable media containing instructions for performing the disclosed methods.

The foregoing general description and the following detailed description are exemplary and explanatory only and are not restrictive of the claims.

BRIEF DESCRIPTION OF THE DRAWINGS

The accompanying drawings, which are incorporated in and constitute part of this disclosure, together with the description, illustrate and serve to explain the principles of various example embodiments.

DETAILED DESCRIPTION

Figure 1:
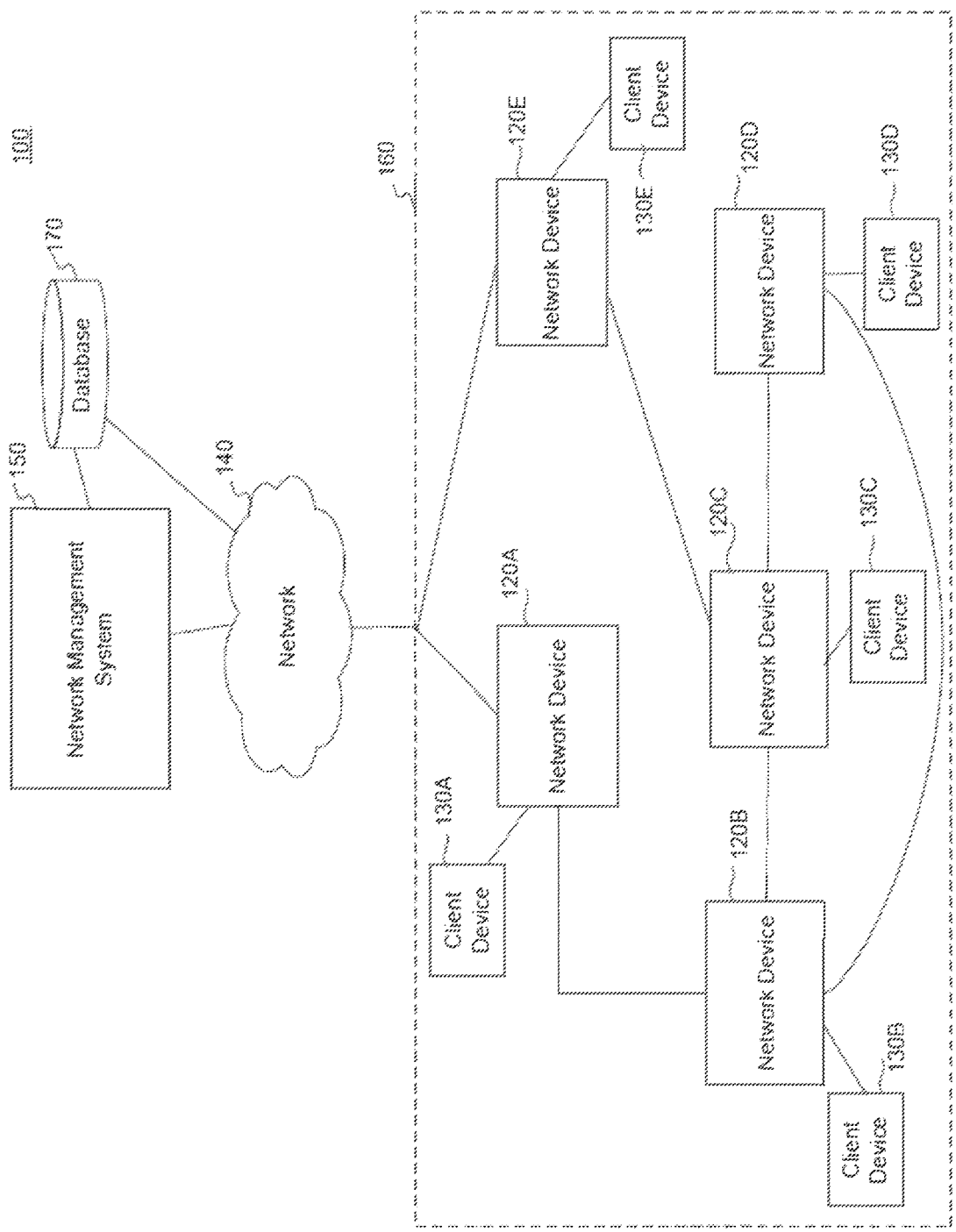
FIG. 1 depicts an exemplary communication system, consistent with disclosed embodiments.

The following detailed description refers to the accompanying drawings. Wherever possible, the same reference numbers are used in the drawings and the following description to refer to the same or similar parts. While several illustrative embodiments are described herein, modifications, adaptations, and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

A communication network can include network nodes (e.g., clients, servers, microservices, virtual machines, serverless code instances, IoT devices, etc.) configured to communicate with one another using communication links. The disclosed embodiments are not limited to any particular communication link implementation or physical medium. The communication links can include wired or wireless communication links. Wired communication links can include, for instance, optical links, electrical communication links, or other suitable links. Wireless communication links can include, for example, microwave, radio wave, optical links, or other suitable wireless links. Communications between network nodes can be implemented using communications protocols. The disclosed embodiments are not limited to any particular communication protocol. Communication protocols can include cellular communication protocols (e.g., 3G, 4G, 5G, or the like), IEEE 802 or IEEE 802-based protocols (e.g., Ethernet, WiFi, Zigbee or the like), digital subscriber line (DSL), plain old telephone service (POTS), or other suitable protocols.

A communication network can be configured to satisfy demands. As used herein, a demand can be a request to communicate (or establish a communication channel, or the like) between a source node and a target node in the network. In some embodiments, a demand can specify a source node and a target node. In various embodiments, one or more of the source node and target node can be implicit or determined by the communication network in response to the demand.

The communication network can satisfy the demands using one or more routes provided through the communication network. Each route can be implemented using hardware (e.g., transceivers, or the like) or software resources (e.g., compute, memory, or the like) of the communication network. Consistent with disclosed embodiments, each route can include one or more service links (e.g., light paths between two nodes in an optical network through which light passes unmodified, or the like). The communication network can be configurable to transmit multiple signals along the same communications link. Each signal can have a center frequency and a spectral width (also referred to herein as a frequency slot width). A combination of center frequency and frequency slot width can define a frequency slot. A communication link can be configurable to transmit a signal using any one of a set of frequency slots. Multiple signals can be transmitted using different, non-overlapping frequency slots. In general, wider frequency slots can transmit more information over the same distance (e.g., increased capacity), or the same information over a greater distance. The capacity constraints arising from frequency slot width can be independent of other capacity constraints that may affect a route (e.g., line rates of a transceiver, or the like).

The disclosed embodiments can be performed using a network graph representing the communication network. The network graph can include vertices corresponding to nodes in the communication network and edges corresponding to communication links in the communication network. Consistent with disclosed embodiments, a vertex or an edge can correspond to a sub-network of the communication network. For example, an edge can correspond to three links linearly connected by two nodes. As an additional example, a vertex can correspond to three connected nodes, each of these nodes connected by a link to at least one of the other two nodes. As used herein, the term graph includes semantically equivalent structures, such as adjacency matrices, adjacency lists, adjacency sets, or other semantically equivalent structures.

Some network configuration approaches assign multiple demands that have the same source node and terminal node to different routes. These different routes are then implemented using separate hardware or software resources. For example, a first transceiver can be configured to use a first frequency slot to implement a first route used by a first demand, while a second transceiver can be configured to use a second frequency slot to implement a second route used by a second demand. While straightforward, this approach can be inefficient. The capacity of a transceiver (e.g., in terms of bandwidth, data rate, or any other relevant parameter) may far exceed the volume (e.g., in terms of bandwidth, data rate, or any other relevant parameter) required to satisfy a single demand. Any excess unused capacity may be wasted, as are the additional hardware and software resources used by the communications network to implement the additional routes.

Furthermore, such network configuration approaches can effectively reduce the capacity of the communications network. In general, accommodating additional demands can become increasingly difficult as the number of routes on the communication network increases. Configuring the communication network to satisfy multiple demands that have the same source node and terminal node using different routes can therefore prevent the communication network from accommodating additional demands.

As described herein, multiple demands having the same source and terminal nodes can be packaged together into a single route. However, the combined demands must still satisfy any constraints imposed by the hardware and software resources of the communications network (e.g., port count, transceiver bandwidth or data rate, or the like). Repackaging demands in this manner can be formulated as a bin packing problem, in which the demands have volumes and the different transceiver types constitute different "bins" of different capacities. However, bin packing is an NP-complete problem, with no known polynomial time solution.

The disclosed embodiments include systems and methods for repackaging multiple demands into a single route. Consistent with disclosed embodiments, a network management system (or other component of a communications network, as described herein), can obtain set of demands having common source and destination nodes, a set of transceiver types, and an objective function. The network management system can generate an assignment of demands to transceivers that approximates an optimal solution under the given objective function. The disclosed embodiments can be performed in a practical amount of time and improve upon naïve methods that assign each demand to a separate route. The disclosed embodiments therefore enable improvements in communications network capacity and efficiency. Accordingly, the disclosed embodiments provide technical improvements in the technical field of network communications.

FIG. 1 depicts an exemplary communication system 100, consistent with disclosed embodiments. Communication system 100 includes, for example, a network 140, network management system 150, database 170, network devices 120A-120E (collectively nodes 120), and client devices 130A-130E (collectively client devices 130). Nodes 120 and client devices 130 form a communication network 160, in which the nodes 120 provide communication services to client devices 130. The nodes can include hardware-based or software-based switches, routers, splitters, or the like that facilitate delivery of communication services to client devices 130. The components and arrangements shown in FIG. 1 are not intended to limit the disclosed embodiments, as the system components used to implement the disclosed embodiments can vary. For example, each of nodes 120 may be associated with zero or more client devices 130. In various embodiments, communication network 160 can be implemented using on-premises network environments, virtualized (cloud) network environments, or combinations of on-premises and cloud networks. Consistent with embodiments described herein, various types of data may be communicated over communication network 160, such as Internet (e.g., IP protocol) data, telephony or telecommunications data, satellite data, IoT-based data, cellular data, proprietary network data, or other suitable data.

Network management system 150 can be a computer-based system including computer system components, desktop computers, workstations, tablets, handheld computing devices, memory devices, and/or internal network(s) connecting the components. Network management system 150 can be configured to manage communication network 160. For example, the network management system 150 may determine network routes and allocate resources for demands on communication network 160 (e.g., by determining routing and wavelength assignment for a given set of demands). Furthermore, as described herein, network management system 150 may repackage demands to improve the efficiency and capacity of communication network 160.

Network 140 can facilitate communication between the network management system 150 and the communication network 160. Network management system 150 may send data to nodes 120 via network 140 to allocate resources for demands in communication network 160. Network management system 150 may also receive data from nodes 120 via network 140. This data can indicate the status of communication links in communication network 160.

Network 140 can be an electronic network. Nodes 120 can be configured to receive data over network 140 and process/analyze queries and data. Examples of network 140 include a local area network (LAN), a wireless LAN (e.g., a "WiFi" or mesh network), a Metropolitan Area Network (MAN) that connects multiple LANs, a wide area network (WAN) (e.g., the Internet), a dial-up connection (e.g., using a V.90 protocol or a V.92 protocol), a satellite-based network, a cellular-based network, etc. In the embodiments described herein, the Internet may include any publicly accessible network or networks interconnected via one or more communication protocols, including, but not limited to, hypertext transfer protocol (HTTP/s) and transmission control protocol/internet protocol (TCP/IP). Moreover, the electronic network may also include one or more mobile device networks, such as a Long-Term Evolution (LTE) network or a Personal Communication Service (PCS) network, that allow mobile devices (e.g., client devices 130) to send and receive data via applicable communication protocols, including those described above.

In the illustrated example, nodes 120A and 120E are directly connected to network 140, and nodes 120B-120D connect to the network 140 via their connection to nodes 120A and/or 120E. Nodes 120B-120D may also directly connect to network 140, or may indirectly connect to the network 140 through numerous other devices. Nodes 120 may be connected to one another via copper wire, coaxial cable, optical fiber, microwave links, or other satellite or radio communication components. Accordingly, nodes 120 may each have a corresponding communication interface (e.g., wireless transceiver, wired transceiver, adapter, etc.) to allow for such communications.

As shown in FIG. 1, nodes 120A-120E are connected to one another. In this example, node 120A is connected to node 120B, node 120B is connected to nodes 120A and 120C, node 120C is connected to node 120B, 120D, and 120E, node 120D is connected to node 120C, and node 120E is connected to node 120C. In some embodiments, the network management system 150 may obtain the connectivity status between the network devices 120 and generate a representation (e.g., a graph) of the connectivity of the network. In various embodiments, the network management system 150 can acquire the network topology from a server or a database associated with a service provider providing the communication network 160. As may be appreciated, communication network 160 illustrated in FIG. 1 is not intended to be limiting. The disclosed embodiments include other service network configurations and topologies.

Network management system 150 can be implemented using one or more computing devices (e.g., a node of node 120, a mobile device, laptop, desktop, workstation, server, computing cluster or cloud computing platform, or the like). Network management system 150 can be implemented as a distributed system over multiple computing devices. The disclosed embodiments are not limited to any particular implementation of network management system 150. In some embodiments, network management system 150 can be implemented over the nodes of communication network 160.

Database 170 can include one or more physical or virtual storages coupled with the network management system 150. Database 170 may be configured to store information associated with the communication network 160, such as a network topology, the capabilities of the nodes 120, the demands and corresponding configurations (e.g., routes or the like) provided by the communication network 160, and so on. Database 170 may also be adapted to store processed information associated with the network topology and demands in the communication network 160, so as to facilitate efficient route configurations and resource allocations to satisfy the demands in the communication network 160. For example, database 170 may be adapted to store a preplan assignment (or components thereof). The data stored in database 170 may be transmitted to the network management system 150 and/or the nodes 120. In some embodiments, database 170 can be stored in a cloud-based server (not shown) accessible to the network management system 150 and/or the nodes 120 through the network 140. While the database 170 is illustrated as an external device connected to the network management system 150, the database 170 may also reside within the network management system 150 as an internal component of the network management system 150. In some embodiments, database 170 can be distributed among the nodes of communication network 160.

As shown in FIG. 1, nodes 120 can be connected with client devices 130 respectively to service demands. As an example, client devices 130 may include a display such as a television, tablet, computer monitor, video conferencing console, IoT device, or laptop computer screen. Client devices 130 may also include video/audio input devices such as a video camera, web camera, or the like. As another example, client devices 130 may include mobile devices (e.g., a wearable device, a tablet, a smartphone, a laptop, or other mobile device having display and video/audio capture capabilities). While FIG. 1 shows one client device 130 connected to each node, zero or more client devices 130 may be connected to a node.

In some embodiments, communication network 160 can include an optical network, where the nodes 120 are interconnected by optical fiber links. Such optical fiber links can include optical fiber links that support communication over multiple optical channels using multiple optical wavelengths. The optical network can be implemented, at least in part, using a wavelength division multiplexing (WDM) physical layer. A WDM optical signal can use a plurality of transmission channels, each channel carrying an information signal modulated over a carrier wavelength. A node can be configurable to switch a channel from an input fiber to an output fiber, or to add/drop traffic. A node can include a wavelength switch or an optical add/drop multiplexer that performs optical add, drop, and pass through. A node may include optical or optical/electrical elements configurable to perform functions including compensating, amplifying, switching, restoring, performing wavelength conversion of incoming optical signals, etc. The optical fiber links may include dispersion compensation fibers (DCF), optical filters, amplifiers, and other relevant optical components suitable for operation of optical networks. The network management system 150 or database 170 can store topologic data that includes information about optical channels and their associated wavelengths. The WDM physical layer can be configured to support flexible assignment of frequencies and wavelengths to signals. For example, a communication link can carry a first signal and a second signal. The first signal can have a first spectral width (also referred to herein as a frequency slot width) and a first central frequency, while the second signal has a second spectral width and a second central frequency. The first and second signals can be non-overlapping in the frequency spectrum. In some embodiments, the WDM physical layer can be or support an elastic optical network (e.g., a "Flexgrid" network or the like). Purely for convenience of explanation, frequency slots are sometimes depicted herein as contiguous subsets of an array of unit frequency slot widths. In such depictions, the width of the frequency slot can be the number of unit frequency slot widths in the contiguous subset. The central frequency of the frequency slot can be the midpoint of the contiguous subset. Without departing from envisioned embodiments, the disclosed embodiments may be implemented using central frequencies and frequency slot widths demarcated in Hz (e.g., integer multiples of 6.25 GHz, 12.5 GHz, or other base values; arbitrary spectrum bands defined by central frequencies and bandwidths; or other suitable schema).

Figure 2:
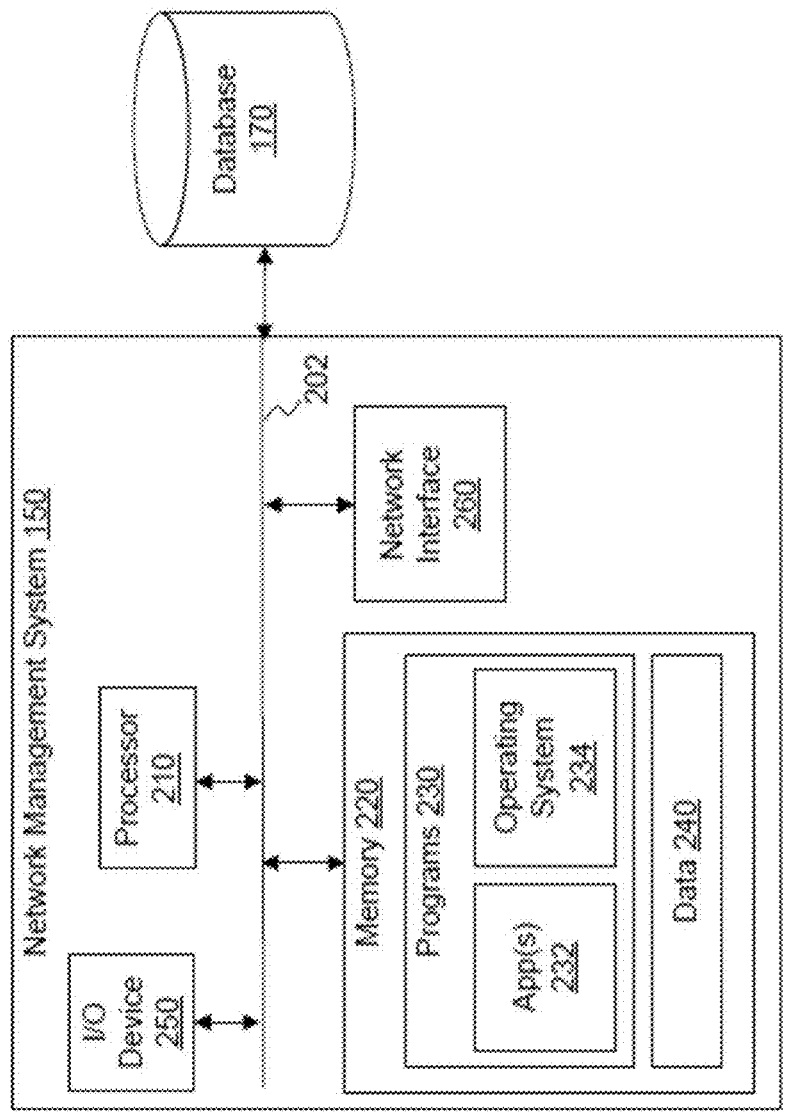
FIG. 2 depicts a diagram of an exemplary computing device suitable for implementing a network management system or other component of a communication system, consistent with disclosed embodiments.

FIG. 2 depicts a diagram of an exemplary computing device 201 (e.g., a mobile device, laptop, desktop, workstation, network appliance, or the like) suitable for implementing network management system 150, consistent with the disclosed embodiments. Network management system 150 can be implemented using one or more such computing devices 201 (e.g., a single computing device, a cluster of such computing devices, a virtual computing device running on such a computing device, a cloud-computing platform implemented using such devices, or another suitable implementation). Network management system 150 can be configured, by configuring the computing device(s) implementing network management system 150, to perform systems and methods for managing a communication network, consistent with disclosed embodiments. In such a manner, network management system 150 can be configured to determine paths for demands over a network graph. In some embodiments, network management system 150 can configure a communication network corresponding to the network graph to satisfy the demands using routes corresponding to the paths.

Consistent with disclosed embodiments, computing device 201 can also be suitable for implementing a node, such as one or more of nodes 120. The one or more of nodes 120 can be configured, by configuring the computing device(s) implementing the one or more of nodes 120, to perform systems and methods for configuring the communication network to satisfy one or more demands. The one or more of nodes 120 can be configured to satisfy one or more demands using routes on the communication network. The routes can correspond to determined paths on a network graph that corresponds to the communication network.

The computing device 201 can include a bus 202 (or other communication mechanism) which interconnects subsystems and components for transferring information within the computing device. As shown, the computing device 201 can include one or more processors 210, input/output ("I/O") devices 250, network interface 260 (e.g., a modem, Ethernet card, or any other interface configured to exchange data with a network), and one or more memories 220 storing programs 230 including, for example, server app(s) 232, operating system 234, and data 240, and can communicate with an external database 170 (which, for some embodiments, may be included within the computing device 201).

The processor 210 can be a central processing unit (CPU), graphical processing unit (GPU), application specific integrated circuit (ASIC) of system on a chip (SoC), field programmable gate array (FPGA), or the like. The processor 210 may comprise a single core or multiple core processors executing parallel processes simultaneously. For example, the processor 210 may be a single-core processor configured with virtual processing technologies. In certain embodiments, processor 210 may use logical processors to simultaneously execute and control multiple processes. The processor 210 may implement virtual machine technologies, or other technologies to provide the ability to execute, control, run, manipulate, store, etc. multiple software processes, applications, programs, etc. In some embodiments, the processor 210 may include a multiple-core processor arrangement (e.g., dual, quad core, etc.) configured to provide parallel processing functionalities to allow the computing device 201 to execute multiple processes simultaneously. It is appreciated that other types of processor arrangements could be implemented that provide for the capabilities disclosed herein.

The memory 220 may be a volatile or non-volatile, magnetic, semiconductor, tape, optical, removable, non-removable, or other type of storage device or tangible or non-transitory computer-readable medium that stores one or more program(s) 230 such as server apps 232 and operating system 234, and data 240. Possible forms of non-transitory media include, for example, a flash drive, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, or any other flash memory, NVRAM, a cache, a register, any other memory chip or cartridge, and networked versions of the same.

Computing device 201 may include one or more storage devices configured to store information used by processor 210 (or other components) to perform certain functions related to the disclosed embodiments. For example, computing device 201 may include memory 220 that includes instructions to enable the processor 210 to execute one or more applications, such as server apps 232, operating system 234, and any other type of application or software known to be available on computer systems. Alternatively or additionally, the instructions, application programs, etc. may be stored in an external database 170 (which can also be internal to computing device 201) or external storage communicatively coupled with computing device 201 (not shown), such as one or more database or memory accessible over the network 140.

Database 170 or other external storage may be a volatile or non-volatile, magnetic, semiconductor, tape, optical, removable, non-removable, or other type of storage device or tangible or non-transitory computer-readable medium. Memory 220 and database 170 may include one or more memory devices that store data and instructions used to perform one or more features of the disclosed embodiments. The memory 220 and database 170 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational databases.

In some embodiments, computing device 201 may be communicatively connected to one or more remote memory devices (e.g., remote databases or the like) through network 140 or a different network. The remote memory devices can be configured to store information that the computing device 201 can access and/or manage. By way of example, the remote memory devices could be document management systems, Microsoft™ SQL database, SharePoint™ databases, Oracle™ databases, Sybase™ databases, or other relational databases. Systems and methods consistent with disclosed embodiments, however, are not limited to separate databases or even to the use of a database.

Programs 230 may include one or more software modules configured to cause processor 210 to perform one or more functions of the disclosed embodiments. Moreover, processor 210 may execute one or more programs located remotely from one or more components of communication system 100. For example, computing device 201 may access one or more remote programs that, when executed, perform functions consistent with disclosed embodiments.

Consistent with disclosed embodiments, server app(s) 232 can cause processor 210 to perform functions consistent with disclosed embodiments. For example, server app(s) 232 can cause processor 210 to determine routes and allocate resources for services to be delivered in communication network 160. Similarly, server app(s) 232 can cause processor 210 to determine a packaging of multiple demands into one or more routes, as disclosed herein.

In some embodiments, program(s) 230 may include operating system 234 performing operating system functions when executed by one or more processors such as processor 210. By way of example, operating system 234 may include Microsoft Windows™, Unix™, Linux™ Apple™ operating systems, Personal Digital Assistant (PDA) type operating systems, such as Apple IOS™, Google Android™, Blackberry OS™, or other types of operating systems. Accordingly, disclosed embodiments may operate and function with computer systems running any type of operating system 234. Computing device 201 may also include software that, when executed by processor 210, enables communication with network 140 through the network interface 260 and/or a direct connection to one or more nodes 120A-120E.

In some embodiments, data 240 may include, for example, network configurations, requirements of demands, routes for satisfying the demands (e.g., backup routes) and relationships between the routes (e.g., mappings between backup routes and communication link failures), capacities of the network devices, and so on. For example, data 240 may include network topology of the communication network 160 and operating status (e.g., operating properly or not operating properly) of the communication links between the nodes 120. The data 240 may also specify demand requirements and routes for each demand in the communication network 160. The data 240 may also specify transceiver types or transceiver properties (e.g., spectrum width(s), length or Optical Signal to Noise Ratio bounds, capacity, or cost). For example, a transceiver type may indicate the ability to store up to v units of data and transmit this data up to a range l by occupying a frequency slot of width w.

Computing device 201 may also include one or more I/O devices 250 having one or more interfaces for receiving signals or input from devices and providing signals or output to one or more devices that allow data to be received and/or transmitted by network management system 150. For example, computing device 201 may include interface components for interfacing with one or more input devices (e.g., keyboard(s), mouse device(s), and the like) that enable computing device 201 to receive input from an operator or administrator (not shown).

Figure 3:
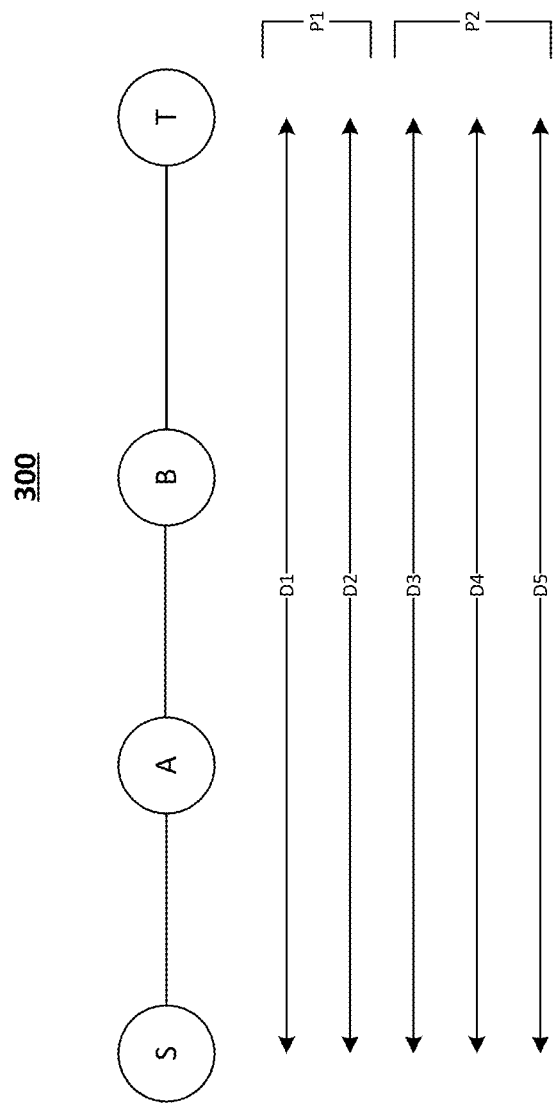
FIG. 3 depicts the packaging of five demands on a communication network into two packages, consistent with disclosed embodiments.

FIG. 3 depicts the packaging of five demands (e.g., $D_1$, $D_2$, $D_3$, $D_4$, and $D_5$) on a communication network (e.g., communications network 160, or the like) into two packages (e.g., $P_1$ and $P_2$), consistent with disclosed embodiments. In FIG. 3, the communication network is represented by a corresponding network graph 300 having four vertices, the four vertices corresponding to four nodes of the communication network. Each of the five demands begins at the node corresponding to vertex S and ends at the node corresponding to vertex T.

Consistent with disclosed embodiments, package p1 may correspond to a first transceiver and package p2 may correspond to a second transceiver. A network management system (e.g., network management system 150, or the like) can determine that demands $D_1$ and $D_2$ can be satisfied using the first transceiver, and that demands $D_3$, $D_4$, and $D_5$ can be satisfied using the second transceiver. The network management system can provide instructions to the relevant ones of nodes S, A, B, and T to configure these nodes to satisfy the demands using the two packages.

Figure 4:
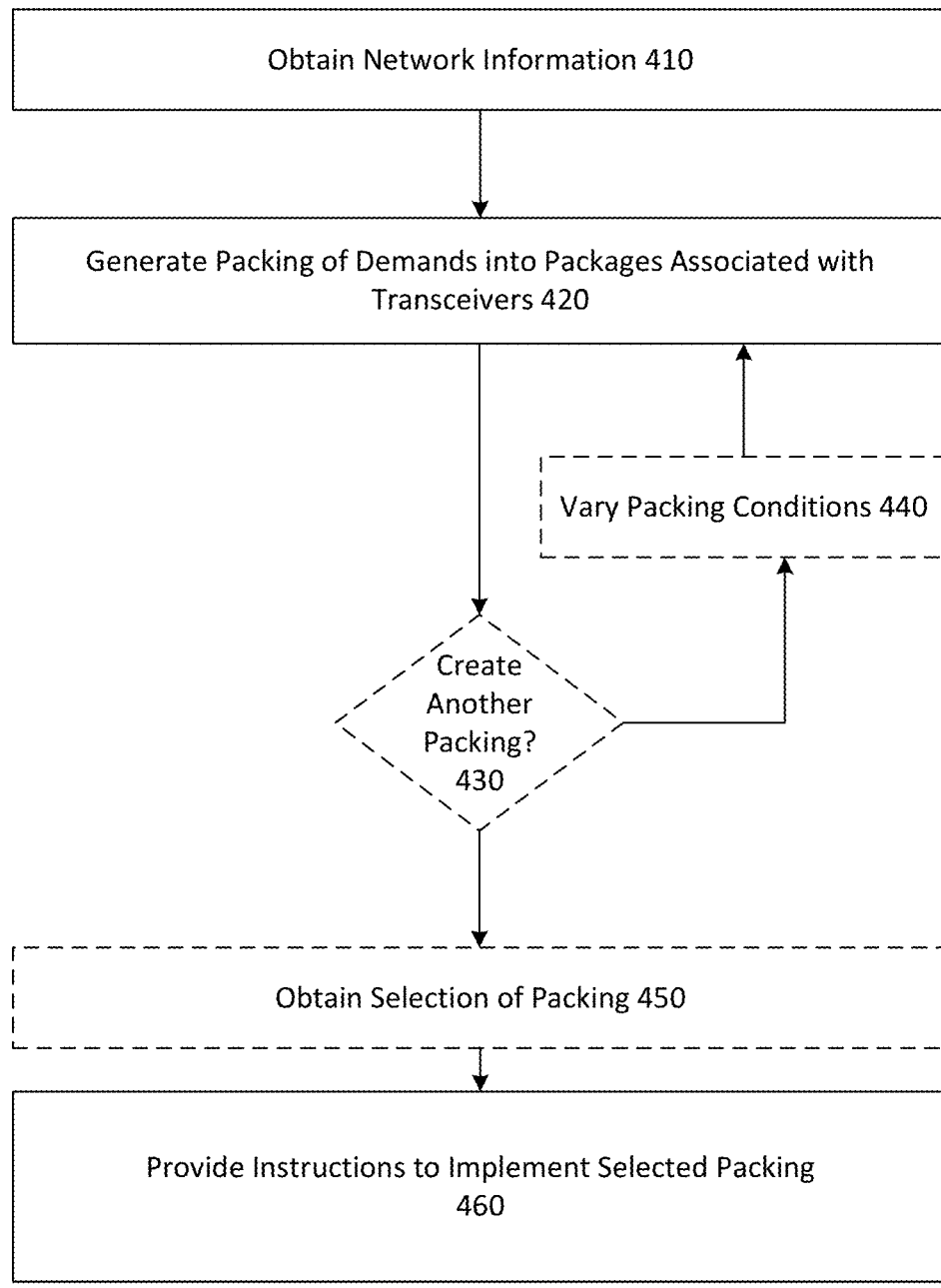
FIG. 4 depicts a method for dividing a set of demands into packages, consistent with disclosed embodiments.

FIG. 4 depicts a method 400 for dividing a set of demands into packages, consistent with disclosed embodiments. For convenience of disclosure, a network management system (e.g., network management system 150 of communication system 100) is described as performing method 400. However, the disclosed embodiments are not so limited. In some embodiments, method 400 can be performed by another component of a communication system (e.g., one of nodes 120, or the like), or another system.

In step 410 of method 400, the network management system can obtain network information, consistent with disclosed embodiments. The network information can specify a set of demands and a set of transceiver types. The set of demands can include demands having the same source node and terminal node on a communication network (e.g., communication network 160, or the like).

In some embodiments, method 400 can be used to manage an existing communication network. In such embodiments, the network information can reflect the status of that existing communication network. For example, the demands can be demands present or requested on the network and the set of transceiver types can be transceiver types available for satisfying the demands.

In some embodiments, method 400 can be used to identifying a potential configuration for a communication network. For example, a hypothetical set of demands can be provided for an existing or hypothetical communication network. These hypothetical demands can be based on historical data, predictions, or any other suitable estimate. The set of transceivers can include existing transceivers and/or potentially usable transceivers. In this manner, method 400 can be used to investigate a potential configuration of transceivers for satisfying a hypothetical set of demands.

In some embodiments, the network information can indicate the topology of the communication network. For example, the network information can specify a network graph for the communication network. As described herein, the network graph can include vertices corresponding to nodes of the communication network and edges corresponding to links of the communication network. In some embodiments, the network information can specify the route for each demand on in the network graph. In some embodiments, the network information can specify a volume for each demand.

In some embodiments, the network information can include distance information corresponding to links in the communication network. For example, the edges of a network graph obtained by the network management system can be associated with the distance spanned by the corresponding communication link.

In some embodiments, the network information can specify transceiver characteristics for transceiver types. The transceiver characteristics can include frequency slots, central frequencies, frequency widths, length or optical signal to noise ratio bounds, capacities, or the like. In some embodiments, the network information can specify a cost for each transceiver type. In some embodiments, the network information can specify a mapping or function from transceiver characteristics to a weight.

Consistent with disclosed embodiments, the network management system can obtain the network information from other component(s) of the communication system (e.g., a database, such as database 170, one or more nodes, such as nodes 120, or the like). In some embodiments, the network management system can construct the network information from information received from the other components of the communication system. For example, the network management system can receive transceiver information from nodes and demand information from a database of the communication system. As a further example, the network management system can receive information specifying adjacent nodes from each node in the communication network. The network management system can use this information to construct a network graph of the network.

In step 420 of method 400, the network management system can generate a packing of demands into packages, consistent with disclosed embodiments. In some embodiments, a candidate packing can divide the set of demands received in step 410 into one or more packages. Each package can include a different subset of the set of demands received in step 410.

Consistent with disclosed embodiments, a package can be associated with a transceiver type. A total volume of the subset of demands included in a package can be less than or equal to a capacity of the transceiver type. In some instances, multiple packages in a candidate packing can be associated with the same transceiver type. In some instances, every package in a candidate packing can be associated with a different transceiver type.

Consistent with disclosed embodiments, a cost can be associated with the packing. The cost can depend on costs associated with the packages. For example, the cost associated with the packing can be the sum of the costs associated with the packages. In some embodiments, the network management system can determine costs for the packages using a cost function. In some embodiments, the value of the cost function for a package can depend on the associated transceiver type, the total volume of the demands included in the package, a total volume of the subset of the set of demands, the number of demands in the set of demands, the number of demands included in the package, or some combination of the foregoing. In some embodiments, the cost can depend on at least one of a spectral width, length bound, OSNR bound, or capacity of the associated transceiver type. In some embodiments, the cost of the package can be the sum of the costs of the transceivers in the package.

As may be appreciated, the disclosed embodiments are not limited to a particular cost function. Instead, the particular cost function used for a particular communication network can depend on the requirements of that network. For example, the cost function for a package can be:

$$\frac{c^n(t)}{\sum_{y \in Y} v(y)} \cdot \frac{|X|}{|Y|}$$

where $c(t)$ can be the cost associated with the transceiver type, n is some exponent (e.g., 1, 2, or more), $\sum_{y \in Y} v(y)$ can be the sum of volumes of the demands included in the package, $|Y|$ can be the number of demands included in the package, and $|X|$ can be the total number of demands in the set of demands. In some embodiments, a value can be associated with the demands included in the package. In such embodiments, rather than being the sum of volumes of the demands included in the package, $\sum_{y \in Y} v(y)$ can be the sum of values of the demands included in the package. Such a cost function can favor packings with a greater total volume (or value) of demands, including a greater number of lower-volume demands in the package, and a lower bin cost. Alternatively, for example, the cost function for a package can be:

$$\frac{c^n(t)}{\sum_{y \in Y} v(y)} \cdot \frac{|Y|}{|X|}$$

Such a cost function can favor packings with a greater total volume (or value) of demands, including a smaller number of higher-volume demands in the package, and a lower bin cost.

In some embodiments, the network management system can filter the set of transceivers prior to generating the packing. In some embodiments, the transceivers can be filtered based on one or more transceiver characteristics. For example, the network information can include a distance between the source node and the terminal node (or capacity bounds, OSNR bound, cost bound, or the like). The transceiver characteristics can include length bounds (or OSNR values, capacities, costs, or the like). The network manager can filter the set of transceiver types based on the network information. For example, the set of transceiver types can be filtered based on length bounds and distance (or OSNR and OSNR bound, capacity and capacity bound, cost and cost bound, or the like). Transceiver types having length bounds less than the distance between the source node and the terminal node may not be included in generation of the packing. In some instances, the network management system can obtain n paths (e.g., two, three, or more paths) through the communication network that connect the source and terminal nodes. In such instances, the distance may correspond to the longest of the n paths. In such instances, filtering the set of transceiver types based on the distance and length bounds can ensure that the selected transceivers can service even the longest of the n paths, should shorter paths fail.

In optional step 430 of method 400, the network management system can determine whether to create another packing, consistent with disclosed embodiments. In some embodiments, while a termination condition remains unsatisfied, method 400 can proceed to step 440. Otherwise, method 400 can proceed to step 450.

In some embodiments, the termination condition can depend on a number or set of packings generated, a duration of generation, or the like. For example, the network management system can be configured to generate packings corresponding to a predetermined or user-specified set of cost functions, transceiver types, or transceiver characteristics. As an additional example, the network management system can be configured to generate packings until an elapsed time threshold is exceeded.

In some embodiments, a termination condition can depend on characteristics of the packing generated in step 420. Such characteristics can include the cost of the packing, the types of transceivers or number of transceivers including the packing, the number or proportion of the set of demands included in the packing, or similar characteristics. For example, when the cost of the packing exceeds a threshold, the termination condition may be unsatisfied. As an additional example, the user may specify a desired (or undesired) transceiver type. If the packing excludes (or includes) this transceiver type then the termination condition may be unsatisfied. As a further example, the termination condition may be unsatisfied when the packing excludes any of the demands in the set of demands, or more than a threshold number or proportion of the set of demands.

For example, a route between a source node and a terminal node may include a communication link limited to a frequency width of 768. The set of demands can include 300 demands of volume 100. The set of transceivers can include a first transceiver type that has a frequency width of 6, a capacity of 200, and a weight of 30. The set of transceivers can include a second transceiver type that has a frequency width of 8, a capacity of 400, and a weight of 70. In a first iteration, the packing conditions can specify that the cost of a package is the weight of the package. In this iteration, the network management system can determine a minimum cost packing that packs 256 of the demands into 128 packages using the first transceiver type, for a cost of 3840. The remaining demands cannot be included in packages on that route, due to the limited bandwidth of the communication link. In this example, the termination condition is unsatisfied, because some of the demands were not packed.

In optional step 440 of method 400, the network management system can update the packing conditions, consistent with disclosed embodiments. In various embodiments, updating the packing conditions can include updating the determination of the package cost. Updating the determination of the package cost can include changing parameter values for a cost function that determines the cost for a package, changing the cost function used to determine the cost for a package, or some combination of the foregoing.

In various embodiments, updating the packing conditions can include adding or removing transceiver types, or changing the characteristics associated with a transceiver type. Adding or removing transceiver types can include prioritizing transceivers having greater spectral width, length bound, OSNR bound, or capacity. For example, transceiver types with less than a threshold spectral width, length bound, OSNR bound, or capacity may be excluded from the set of transceivers.

Method 400 can then return to step 420. As may be appreciated, the network management system may generate a different packing, given the updated packing conditions. To continue the prior example, in a second iteration, the packing conditions can specify that the cost of a package is the frequency width of the package. In this iteration, the network management system can determine a minimum cost packing that packs all 300 of the demands into 75 packages using the second transceiver type, for a cost of 600. Because this packing includes all of the demands, the termination condition can be satisfied and method 400 can proceed to step 450.

In optional step 450 of method 400, the network management system can select (or obtain a selection of) one of the packings generated by the network management system, consistent with disclosed embodiments. In some embodiments, the network management system can automatically select among the packings based on costs associated with the packings, or other criteria. In some embodiments, the network management system can provide an indication of the packings to a user. In response, the network management system can receive from the user a selection of one of the candidate packings.

In step 460 of method 400, the network management system can provide instructions to implement the determined demand packing, consistent with disclosed embodiments. In some embodiments, the instructions can be provided to the communication network. For example, when method 400 is being used to manage an existing communication network, the instructions can configure the communication network to satisfy each package of demands in a packing (e.g., the packing generated in step 420 or selected in optional step 450) using the transceiver type associated with the package. In some embodiments, the instructions can be provided to a user of the communication system. For example, when method 400 is being used to identify a potential configuration for a communication network, the instructions can indicate the type and configuration of the transceivers used to package the demands.

Figure 5:
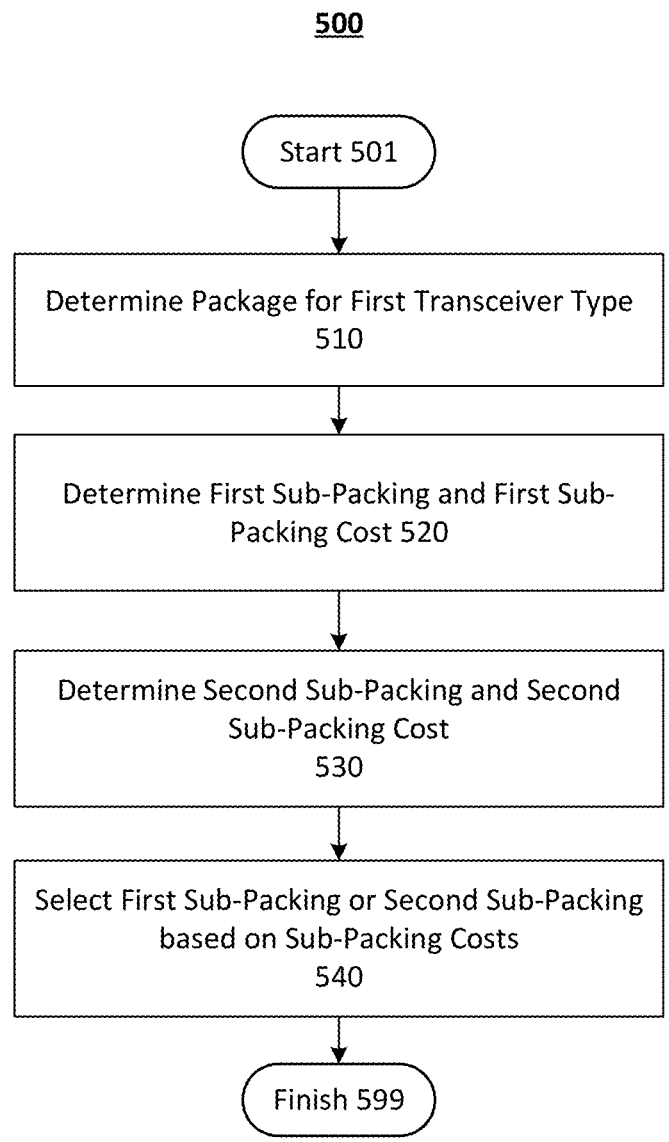
FIG. 5 depicts a dynamic programming method for generating a packing of a set of demands into packages, consistent with disclosed embodiments.

FIG. 5 depicts a dynamic programming method 500 for generating a packing of a set of demands into packages, consistent with disclosed embodiments. For convenience of disclosure, a network management system (e.g., network management system 150 of communication system 100) is described as performing method 500. However, the disclosed embodiments are not so limited. In some embodiments, method 500 can be performed by another component of a communication system (e.g., one of nodes 120, or the like), or another system.

In step 501, process 500 can start. In some embodiments, process 500 can be created by another process or system. For example, process 500 can be created by process 400 in step 420 (or the like). Process 400 can provide this instance of process 500 with a set of demands and a set of transceiver types. In some embodiments, process 500 can be performed iteratively or recursively. For example, a first instance of process 500 can obtain a set of transceiver types and a set of demands. The first instance of process 500 may then create additional instances of process 500. In this manner, process 500 can break the larger problem of generating the packing into smaller problems.

In step 510 of process 500, the network management system can determine a package for a first transceiver type, consistent with disclosed embodiments. The first transceiver type can be selected from the set of transceiver types. In some embodiments, the first transceiver type can be selected based on the relative capacities of the transceiver types in the set of transceiver types. In some embodiments, the first transceiver type can have the smallest capacity among the transceiver types in the set of transceiver types. The network management system can create a package from the set of demands using a knapsack packing or bin packing algorithm. The package can be associated with the selected first transceiver type and can have a total volume less than or equal to the capacity of the first transceiver type.

In step 520 of process 500, the network management system can determine a first sub-packing and a first sub-packing cost, consistent with disclosed embodiments. In some embodiments, the first sub-packing can include the package determined in step 521 and a sub-packing of the remaining demands in the set of demands obtained in step 501 (e.g., the remaining demands). The sub-packing of the remaining demands can be determined by another instance of method 500. This instance can be provided (e.g., called or initialized with) the set of transceiver types obtained in step 501, and the remaining demands. This instance can return a cost and a sub-packing of the remaining demands into one or more packages, each associated with a transceiver type. In some embodiments, the first sub-packing cost can depend on the cost returned by the instance and the package cost. For example, the first sub-packing cost can be the sum of the instance and package costs.

In step 530 of process 500, the network management system can determine a second sub-packing and a second sub-packing cost, consistent with disclosed embodiments. In some embodiments, the second sub-packing can be determined by another instance of method 500. This instance can be provided (e.g., called or initialized with) the set of demands obtained in step 501, and a subset of the set of transceiver types. The subset of the set of transceiver types (e.g., the remaining transceiver types) can exclude the transceiver type associated with the package determined in step 510. This instance can return the second sub-packing and the second sub-packing cost.

In step 540 of process 500, the network management system can select the first sub-packing or the second sub-packing based on the sub-packing costs, consistent with disclosed embodiments. When the first sub-packing cost is less than the second sub-packing cost, then the network management system can select the first sub-packing (and vice versa).

In step 599, process 500 can finish. When this instance of process 500 was created by another process or method, this instance of process 500 can return the selected sub-packing and the selected sub-packing cost to that process or method. For example, when this instance of process 500 was created by process 400 (e.g., to calculate a packing as part of step 420), process 500 can return the packing to process 400. As an additional example, when this instance of process 500 was created by another instance of process 500 (e.g., to calculate a sub-packing as part of step 520 or 530), this instance of process 500 can return the sub-packing to the other instance of process 400.

Figures 6A, 6B, 6C:
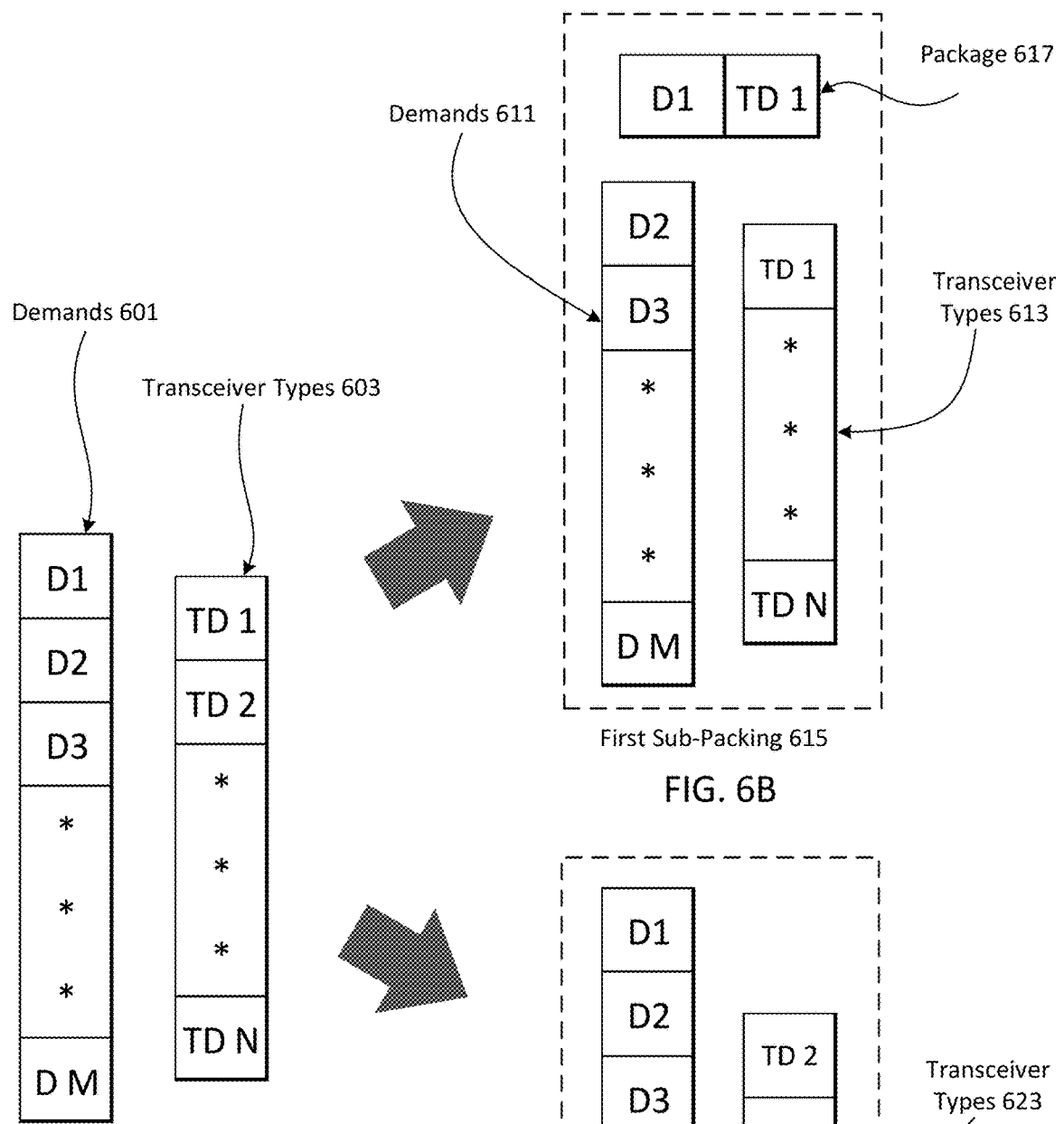
FIGS. 6A to 6C depict an exemplary operation of the process of FIG. 5, consistent with disclosed embodiments.

FIGS. 6A to 6C depict the operation of process 500, consistent with disclosed embodiments. FIG. 6A depicts inputs to an instance of process 500, consistent with disclosed embodiments. As described above, these inputs can include a set of demands 601 (e.g., including demands $D_1$ to $D_m$) and a set of transceivers 603 (e.g., transceiver types $TD_1$ to $TD_N$). The demands can vary in volume. In the example depicted in FIG. 6A, the demands are ordered from least volume ($D_1$) to greatest volume ($D_M$). The transceiver types can vary in capacity. In the example depicted in FIG. 6A, the transceiver types are ordered from least capacity ($TD_1$) to greatest capacity ($TD_N$). As described with regards to FIG. 5, process 500 can include determining first and second sub-packings and costs.

FIG. 6B depicts the components used to generate first sub-packing 615, consistent with disclosed embodiments. First sub-packing 615 represents the case that the solution includes transceiver type $TD_1$. Accordingly, package 617 can be the package generated in step 510. In step 520, another instance of process 500 can be called with demands 611 and transceiver types 613. As shown, demands 611 exclude demand $D_1$, which is accounted for in package 617. In some embodiments, the cost associated with first sub-packing 615 can be the sum of the cost of package 617 and the result returned by the invocation of process 500 with demands 611 and transceiver types 613.

FIG. 6C depicts the components used to generate second sub-packing 625, consistent with disclosed embodiments. In step 530, another instance of process 500 can be called with demands 621 and transceiver types 623. Second sub-packing 625 represents the case that the solution does not include transceiver type $TD_1$. Accordingly, demands 621 includes all the demands and transceiver types 623 excluding transceiver type $TD_1$. In some embodiments, the cost associated with second sub-packing 625 can be the result returned by the invocation of process 500 with demands 621 and transceiver types 623.

As described herein, the network management system can select among the first and second sub-packings based on the costs associated with each packing. In some embodiments, the network management system can return the sub-packing having the lowest cost.

Figure 7:
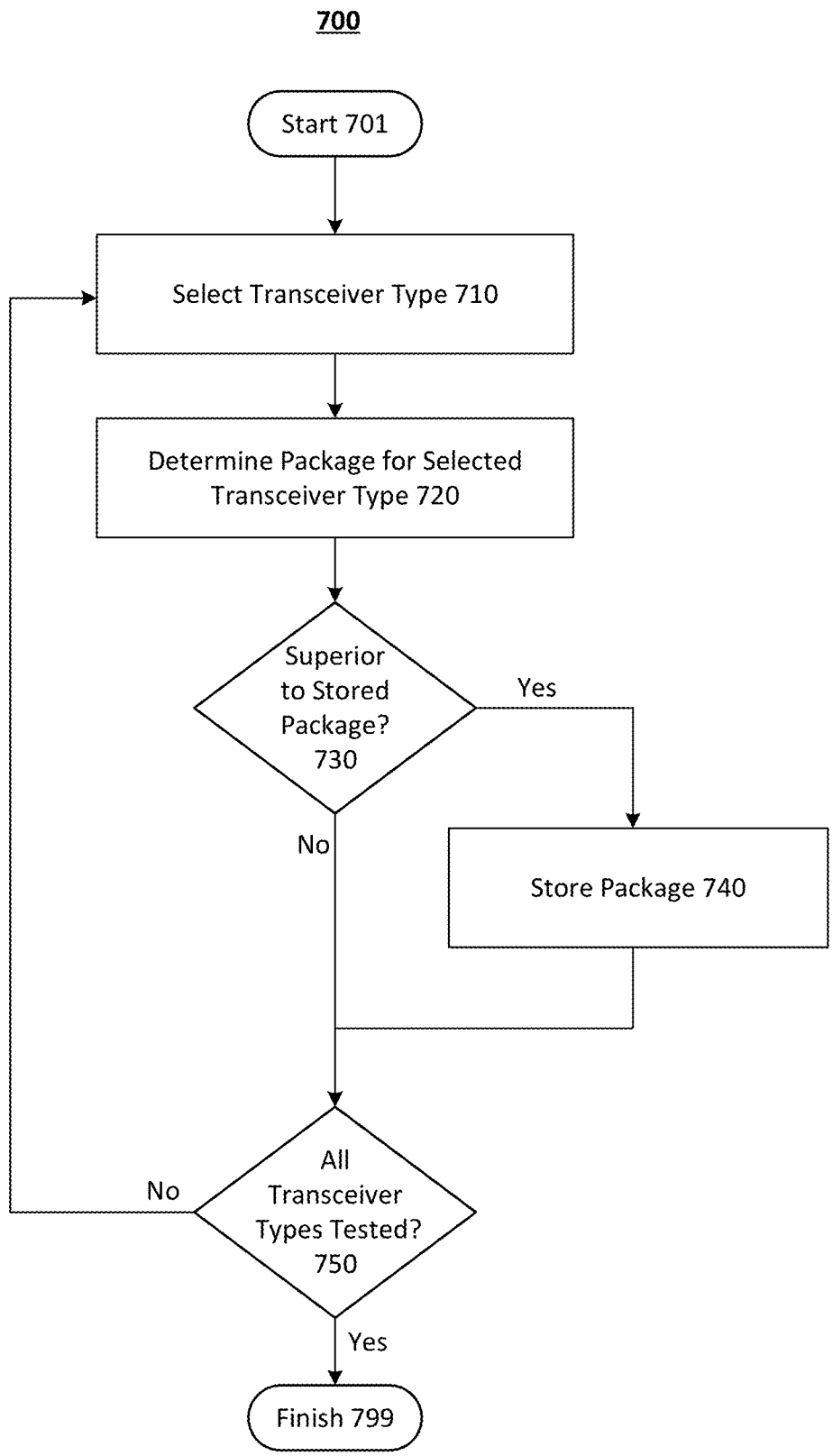
FIG. 7 depicts a process for dividing a set of demands into packages, consistent with disclosed embodiments.

FIG. 7 depicts a process 700 for packing a set of demands into packages, consistent with disclosed embodiments. For convenience of disclosure, a network management system (e.g., network management system 150 of communication system 100) is described as performing method 700. However, the disclosed embodiments are not so limited. In some embodiments, method 700 can be performed by another component of a communication system (e.g., one of nodes 120, or the like), or another system.

In step 701, process 700 can start. In some embodiments, method 700 can be created by another process or system. For example, method 700 can be created by process 400 in step 420 (or the like). Process 700 can provide this instance of process 700 with a set of demands and a set of transceiver types. In some embodiments, the other process or system can perform multiple iterations of process 700. Each iteration can determine a package of demands.

For example, a set of transceiver types and a first set of demands can be provided in a first iteration of process 700. The first iteration of process 700 can determine a package including a first demand subset of the first set of demands. The set of transceiver types and a second set of demands can be provided in a second iteration of process 700. The second set of demands can be the remaining demands in the first set of demands following removal of the first demand subset. The second iteration of process 700 can determine a package including a second demand subset of the second set of demands. The set of transceiver types and a third set of demands can be provided in a third iteration of process 700. The third set of demands can be the remaining demands in the second set of demands following removal of the second demand subset. In some embodiments, iterations of process 700 can continue until all demands have been associated with a package (e.g., the demand subset for an iteration includes all the demands originally provided to that iteration, or a similar condition). The process or system calling process 700 can keep track of the packages returned by each iteration of process 700. These packages can comprise the packing. In this manner, process 700 can be used to iteratively determine a packing of the set of demands into packages associated with transceiver types.

In some embodiments, in step 701, a threshold value can be initialized to a high value (e.g., positive infinity, or the like). A transceiver identifier can be initialized to a null value. A demand subset can be initialized to the empty set.

In step 710 of process 700, the network management system can select a transceiver type, consistent with disclosed embodiments. In some embodiments, the determination can be random. In some embodiments, the determination can be deterministic. For example, the network management system can select the transceiver type based on a transceiver characteristics, such as capacity or cost. For example, the network management system can select the transceiver type having the greatest capacity, or having the least cost.

In step 720 of process 700, the network management system can determine a package for the selected transceiver type, consistent with disclosed embodiments. In some embodiments, the network management system can determine the package using a greedy algorithm. The network management system can include in the package the largest-volume demand less than or equal to the available capacity of the transceiver type. The network management system can then decrement the available capacity of the transceiver type by the volume of the demand. This process can be repeated until all demands have been considered for inclusion in the package.

In step 730 of process 700, the network management system can determine whether the package determined in step 720 is superior to the best stored package, consistent with disclosed embodiments. In some embodiments, this determination can depend on a value for the package and the threshold value of the best package. If the package determined in step 720 is superior to the best stored package, then process 700 can proceed to step 740. Otherwise, process 700 can proceed to step 750.

In step 740 of process 700, the network management system can update the threshold value of the best package to be the value for the package determined in step 720, consistent with disclosed embodiments. The transceiver identifier can be updated to the transceiver type associated with the package determined in step 720. The demand subset can be updated to the demands included in the package determined in step 720. Process 700 can then proceed to step 750.

In step 750 of process 700, the network management system can determine whether all transceiver types in the set of transceivers have been considered, consistent with disclosed embodiments. If not, then process 700 can return to step 710 and a new transceiver type can be considered. Otherwise, process 700 can proceed to step 799.

In step 799, process 700 can finish. Process 700 can return the best package stored in step 740 and the value of this best package. In some embodiments, if the demand subset includes all the demands provided in step 701, then no further iterations of process 700 may be performed. In some embodiments, when the demand subset does not include all the demands provided in step 701, the calling process or system may perform another iteration of process 700. In the next iteration, the set of demands may be the set of demands received in 701, excluding the demands included in the best package stored in step 740.

The disclosed embodiments may further be described using the following clauses:

1. A network management system comprising: at least one processor; and at least one computer readable medium containing instructions that, when executed by the at least one processor cause the network management system to perform operations comprising: obtaining network information for a communication network comprising: a set of demands having a common source node and a common terminal node on the communication network; and a set of transceiver types; packing the set of demands into packages, the packing comprising: determining candidate packages, each candidate package: associated with a transceiver type; including a subset of the set of demands, a total volume of the subset of the set of demands being less than or equal to a capacity of the transceiver type; and having a package cost; selecting among the candidate packages based on the package costs; and updating the set of demands to remove the subset of the set of demands of the selected candidate package; and providing instructions to configure the communication network to satisfy the demands in each package using a transceiver of the transceiver type associated with the selected candidate package.
2. The network management system of clause 1, wherein: the package cost depends on at least one of the associated transceiver type, the total volume of the subset of the set of demands, a total value of the subset of the set of demands, the number of demands in the set of demands, or the number of demands in the subset of the set of demands.
3. The network management system of clause 1, wherein: the package cost depends on at least one of a spectral width, length bound, OSNR bound, or capacity of the associated transceiver type.
4. The network management system of clause 1, wherein: the package cost is: a decreasing function of a total value or total volume of the subset of the set of demands; and an increasing function of a cost of the associated transceiver type.
5. The network management system of any one of clauses 1 to 4, wherein: the candidate packages are determined using a bin-packing or knapsack-packing method.
6. The network management system of any one of clauses 1 to 5, wherein: obtaining the network information for the communication network further comprises obtaining a distance between the source node and the terminal node; each of the set of transceiver types is associated with a length bound; and the operations further comprise filtering the set of transceiver types based on the distance and the length bounds.

7. The network management system of any one of clauses 1 to 6, wherein: packing the set of demands into packages further comprises: generating multiple packings of the set of demands, each packing associated with differing packing conditions; and selecting of one of the multiple packings.

8. A network management system comprising: at least one processor; and at least one computer readable medium containing instructions that, when executed by the at least one processor cause the network management system to perform operations comprising: packing a set of demands on a communication network into packages, the demands have a source node and a terminal node, each of the packages associated with a corresponding transceiver type of a set of transceiver types, the packing comprising: determining a first sub-package of the set of demands into a first package and a remainder packing, the determination comprising: selecting a first transceiver type of the set of transceiver types; determining the first package using the first transceiver type, the first package including a first subset of the set of demands; and determining the remainder packing of the set of demands, excluding the first subset, using the set of transceiver types; determining a first sub-packing cost based on the first package and the remainder packing; determining a second sub-packing of the set of demands using the set of transceiver types, excluding the first transceiver type; determining a second sub-packing cost based on the second sub-packing; and selecting among the first sub-packing and the second sub-packing based on the first sub-packing cost and the second sub-packing cost; and providing instructions to configure the communication network to satisfy the demands in each of the packages using a transceiver of the corresponding transceiver type.

9. The network management system of clause 8, wherein: a cost of the first package depends on at least one of the first transceiver type, a total volume of the first subset, a total value of the first subset, a number of demands in the set of demands, or a number of demands in the first subset.

10. The network management system of clause 8, wherein: a cost of the first package depends on at least one of a spectral width, length bound, OSNR bound, or capacity of the first transceiver type.

11. The network management system of clause 8, wherein: a cost of the first package is: a decreasing function of a total value or total volume of the first subset; and an increasing function of a cost of the first transceiver type.

12. The network management system of any one of clause 8 to clause 11, wherein: the first package is determined using a bin-packing or knapsack-packing method.

13. The network management system of any one of clause 8 to clause 12, wherein: each of the set of transceiver types is associated with a length bound; and the operations further comprise: obtaining a distance between the source node and the terminal node; and filtering the set of transceiver types based on the distance and the length bounds.

14. The network management system of any one of clause 8 to clause 13, wherein: dividing the set of demands on a communication network into packages further comprises: generating multiple packings of the set of demands, each packing associated with differing packing conditions; and selecting of one of the multiple packings.

15. A network management method comprising: obtaining network information for a communication network including: a set of demands having a common source node and a common terminal node on the communication network; and a set of transceiver types; dividing the set of demands into packages, the dividing comprising: determining candidate packages, each candidate package: associated with a transceiver type; including a subset of the set of demands, a total volume of the subset of the set of demands being less than or equal to a capacity of the transceiver type; and having a package cost; selecting among the candidate packages based on the package costs; and updating the set of demands to remove the subset of the set of demands of the selected candidate package; and providing instructions to configure the communication network to satisfy the demands in each package using a transceiver of the transceiver type associated with the selected candidate package.

16. The method of clause 15, wherein: the package cost depends on at least one of the associated transceiver type, the total volume of the subset of the set of demands, a total value of the subset of the set of demands, the number of demands in the set of demands, or the number of demands in the subset of the set of demands.

17. The method of any one of clause 15 to clause 16, wherein: the package cost is: a decreasing function of a total value or total volume of the subset of the set of demands; and an increasing function of a cost of the associated transceiver type.

18. A network management method comprising: dividing a set of demands on a communication network into packages, the demands have a source node and a terminal node, each of the packages associated with a corresponding transceiver type of a set of transceiver types, the dividing comprising: determining a first sub-packing of the set of demands into a first package and a remainder packing, the determination comprising: selecting a first transceiver type of the set of transceiver types; determining the first package using the first transceiver type, the first package including a first subset of the set of demands; and determining the remainder packing of the set of demands, excluding the first subset, using the set of transceiver types; determining a first sub-packing cost based on the first package and the remainder packing; determining a second sub-packing of the set of demands using the set of transceiver types, excluding the first transceiver type; determining a second sub-packing cost based on the second sub-packing; and selecting among the first sub-packing and the second sub-packing based on the first sub-packing cost and the second sub-packing cost; and providing instructions to configure the communication network to satisfy the demands in each of the packages using a transceiver of the corresponding transceiver type.

19. The method of clause 18, wherein: a cost of the first package depends on at least one of the first transceiver type, a total volume of the first subset, a total value of the first subset, a number of demands in the set of demands, or a number of demands in the first subset.

20. The method of any one of clause 18 to clause 19, wherein: a cost of the first package is: a decreasing function of a total value or total volume of the first subset; and an increasing function of a cost of the first transceiver type.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

What is claimed is:

1. A network management system comprising:
    at least one processor; and
    at least one non-transitory, computer-readable medium containing instructions that, when executed by the at least one processor, cause the network management system to perform operations comprising:
        obtaining network information for a communication network comprising demands specifying a common source node and a common terminal node on the communication network;
        recursively generating a first association of subsets of the demands to transceiver types, a total volume of each demand subset being less than or equal to a capacity of the transceiver type associated with the demand subset; and
        providing instructions to configure the communication network according to the first association to satisfy the demands in each demand subset using a transceiver of the transceiver type associated with the demand subset.

2. The network management system of claim 1, wherein: recursively generating the first association of the subsets of the demands to the transceiver types, comprises:
    generating a first recursive sub-association, the first recursive sub-association associating a first demand subset with a first transceiver type of the transceiver types;
    generating a second recursive sub-association, the second recursive sub-association associating the demands with a subset of the transceiver types; and
    selecting as the first association either the first recursive sub-association or the second recursive sub-association.

3. The network management system of claim 2, wherein: generating the first recursive sub-association comprises selecting the first transceiver type based on relative capacities of the transceiver types.

4. The network management system of claim 2, wherein: the first recursive sub-association has a first sub-association cost;
the second recursive sub-association has a second sub-association cost; and
recursively generating the first association comprises selecting the first recursive sub-association or the second recursive sub-association based on the first sub-association cost and the second sub-association cost.

5. The network management system of claim 2, wherein: generating the first recursive sub-association comprises determining a first cost for the association of the first demand subset with the first transceiver type; and
the first cost depends on:
    at least one of the first transceiver type, a total volume of the first demand subset, a total value of the first demand subset, a number of the demands, or a number of demands in the first demand subset; or
    at least one of a spectral width, length bound, OSNR bound, or capacity of the first transceiver type.

6. The network management system of claim 2, wherein: generating the first recursive sub-association comprises determining a first cost for the association of the first demand subset with the first transceiver type; and
the first cost is:
    a decreasing function of a total value or total volume of the first demand subset; and
    an increasing function of a cost of the first transceiver type.

7. The network management system of claim 2, wherein: the first transceiver type is associated with the first demand subset using a bin-packing or knapsack-packing method.

8. The network management system of claim 1, wherein: the operations further comprise:
    obtaining candidate transceiver types, each of the candidate transceiver types being associated with a length bound;
    obtaining a distance between the common source node and the common terminal node; and
    generating the transceiver types by filtering the candidate transceiver types based on the distance and the length bounds.

9. The network management system of claim 1, wherein: the operations further comprise:
    recursively generating multiple associations of the subsets of the demands to transceiver types, each of the multiple associations having been generated subject to differing packing conditions; and
    selecting the first association from among the multiple associations; and
the instructions to configure the communication network according to the first association are provided based on the selection of the first association.

10. The network management system of claim 9, wherein the differing packing conditions specify at least one of differing cost functions, differing included transceiver types, or differing transceiver characteristic priorities.

11. A non-transitory, computer-readable medium containing instructions that, when executed by at least one processor of a network management system, cause the network management system to perform operations comprising:
    obtaining network information for a communication network comprising demands having specifying a common source node and a common terminal node on the communication network;
    recursively generating a first association of subsets of the demands to transceiver types, a total volume of each demand subset being less than or equal to a capacity of the transceiver type associated with the demand subset; and
    providing instructions to configure the communication network according to the first association to satisfy the demands in each demand subset using a transceiver of the transceiver type associated with the demand subset.

12. The non-transitory, computer-readable medium of claim 11, wherein:

recursively generating the first association of the subsets of the demands to the transceiver types, comprises:
  generating a first recursive sub-association, the first recursive sub-association associating a first demand subset with a first transceiver type of the transceiver types;
  generating a second recursive sub-association, the second recursive sub-association associating the demands with a subset of the transceiver types; and
  selecting as the first association either the first recursive sub-association or the second recursive sub-association.

13. The non-transitory, computer-readable medium of claim 12, wherein:
  generating the first recursive sub-association comprises selecting the first transceiver type based on relative capacities of the transceiver types.

14. The non-transitory, computer-readable medium of claim 12, wherein:
  the first recursive sub-association has a first sub-association cost;
  the second recursive sub-association has a second sub-association cost; and
  recursively generating the first association comprises selecting the first recursive sub-association or the second recursive sub-association based on the first sub-association cost and the second sub-association cost.

15. The non-transitory, computer-readable medium of claim 12, wherein:
  generating the first recursive sub-association comprises determining a first cost for the association of the first demand subset with the first transceiver type; and
  the first cost depends on:
    at least one of the first transceiver type, a total volume of the first demand subset, a total value of the first demand subset, a number of the demands, or a number of demands in the first demand subset; or
    at least one of a spectral width, length bound, OSNR bound, or capacity of the first transceiver type.

16. The non-transitory, computer-readable medium of claim 12, wherein:
  generating the first recursive sub-association comprises determining a first cost for the association of the first demand subset with the first transceiver type; and
  the first cost is:
    a decreasing function of a total value or total volume of the first demand subset; and
    an increasing function of a cost of the first transceiver type.

17. The non-transitory, computer-readable medium of claim 12, wherein:
  the first transceiver type is associated with the first demand subset using a bin-packing or knapsack-packing method.

18. The non-transitory, computer-readable medium of claim 11, wherein:
  the operations further comprise:
    obtaining candidate transceiver types, each of the candidate transceiver types being associated with a length bound;
    obtaining a distance between the common source node and the common terminal node; and
    generating the transceiver types by filtering the candidate transceiver types based on the distance and the length bounds.

19. The non-transitory, computer-readable medium of claim 11, wherein:
  the operations further comprise:
    recursively generating multiple associations of the subsets of the demands to transceiver types, each of the multiple associations having been generated subject to differing packing conditions; and
    selecting the first association from among the multiple associations; and
  the instructions to configure the communication network according to the first association are provided based on the selection of the first association.

20. The non-transitory, computer-readable medium of claim 19, wherein:
  the differing packing conditions specify at least one of differing cost functions, differing included transceiver types, or differing transceiver characteristic priorities.

* * * * *